United States Patent [19]
Eaton et al.

[11] Patent Number: 5,869,570
[45] Date of Patent: *Feb. 9, 1999

[54] COMPOSITION OF AND PROCESS FOR FORMING POLYALPHAOLEFIN DRAG REDUCING AGENTS

[75] Inventors: Gerald B. Eaton, Houston; Michael J. Monahan, Katy, both of Tex.

[73] Assignee: Energy & Environmental International, L.C., Houston, Tex.

[*] Notice: This patent issued on a continued prosecution application filed under 37 CFR 1.53(d), and is subject to the twenty year patent term provisions of 35 U.S.C. 154(a)(2).

[21] Appl. No.: 619,840

[22] Filed: Mar. 19, 1996

[51] Int. Cl.⁶ ..................................................... C08L 23/00
[52] U.S. Cl. .................... 524/855; 524/700; 524/773; 524/755; 524/761; 524/762; 524/836
[58] Field of Search ..................................... 524/855, 700, 524/773, 755, 761, 762, 836

[56] References Cited

U.S. PATENT DOCUMENTS

| | | | |
|---|---|---|---|
| 3,542,044 | 11/1970 | Hansen et al. | 137/13 |
| 3,692,676 | 9/1972 | Cutler et al. | 252/8.55 R |
| 3,730,275 | 5/1973 | McClaflin et al. | 166/308 |
| 4,057,680 | 11/1977 | Yamazaki et al. | 526/142 |
| 4,289,679 | 9/1981 | Mack | 260/33 B |
| 4,333,488 | 6/1982 | McClaflin | 137/13 |
| 4,358,572 | 11/1982 | Mack et al. | 526/142 |
| 4,371,455 | 2/1983 | Mack et al. | 252/429 |
| 4,415,714 | 11/1983 | Mack | 526/125 |
| 4,493,903 | 1/1985 | Mack | 502/121 |
| 4,493,904 | 1/1985 | Mack | 502/122 |
| 4,522,982 | 6/1985 | Ewen | 525/240 |
| 4,539,374 | 9/1985 | Fenton et al. | |
| 4,584,244 | 4/1986 | Fenton | 428/407 |
| 4,656,204 | 4/1987 | Duvdevani et al. | 523/175 |
| 4,659,685 | 4/1987 | Coleman, III et al. | 502/113 |
| 4,693,321 | 9/1987 | Royer | 137/13 |
| 4,771,799 | 9/1988 | Baxter et al. | 137/13 |
| 4,771,800 | 9/1988 | Pomeroy | 137/13 |
| 4,797,461 | 1/1989 | Aubanel et al. | 526/348.6 |
| 4,837,249 | 6/1989 | O'Mara et al. | 523/175 |
| 4,845,178 | 7/1989 | Hostetler et al. | 526/153 |
| 4,881,566 | 11/1989 | Ubels et al. | 137/13 |
| 4,940,682 | 7/1990 | Sasaki et al. | 502/113 |
| 4,945,142 | 7/1990 | Gessell et al. | 526/128 |
| 4,952,738 | 8/1990 | Gessell et al. | 585/3 |
| 5,070,160 | 12/1991 | Tomotsu et al. | 526/165 |
| 5,080,121 | 1/1992 | Malik et al. | 137/13 |
| 5,122,584 | 6/1992 | Takahashi | 526/125 |
| 5,238,892 | 8/1993 | Chang | 526/129 |
| 5,241,025 | 8/1993 | Hlatky et al. | 526/127 |
| 5,243,001 | 9/1993 | Winter et al. | 568/911 |
| 5,276,220 | 1/1994 | Samsel et al. | 526/127 |
| 5,278,264 | 1/1994 | Spaleck et al. | 526/127 |
| 5,298,579 | 3/1994 | Hoff et al. | 526/116 |
| 5,304,614 | 4/1994 | Winter et al. | 526/127 |
| 5,328,969 | 7/1994 | Winter et al. | 526/127 |
| 5,349,032 | 9/1994 | Miyake et al. | 526/127 |
| 5,350,817 | 9/1994 | Winter et al. | 526/119 |
| 5,359,015 | 10/1994 | Jejelowo | 526/114 |
| 5,373,072 | 12/1994 | Chang | 526/129 |
| 5,374,752 | 12/1994 | Winter et al. | 556/11 |
| 5,376,697 | 12/1994 | Johnston et al. | 523/175 |
| 5,384,298 | 1/1995 | Inahara et al. | 502/104 |
| 5,395,810 | 3/1995 | Shamshoum et al. | 502/113 |
| 5,416,178 | 5/1995 | Winter et al. | 526/160 |
| 5,416,179 | 5/1995 | Welch et al. | 526/160 |
| 5,434,115 | 7/1995 | Yamada et al. | 502/103 |
| 5,436,212 | 7/1995 | Geerts | 502/113 |
| 5,442,019 | 8/1995 | Agapiou et al. | 526/82 |
| 5,480,849 | 1/1996 | Gustafsson et al. | 502/115 |
| 5,480,948 | 1/1996 | Geerts | 526/142 |
| 5,521,242 | 5/1996 | Supcoe et al. | 524/376 |
| 5,604,171 | 2/1997 | Collette et al. | 502/120 |

FOREIGN PATENT DOCUMENTS

| | | |
|---|---|---|
| 0005215A | 11/1979 | European Pat. Off. . |
| 0108156A | 5/1984 | European Pat. Off. . |
| 0292797A | 11/1988 | European Pat. Off. . |
| 0535230A | 4/1993 | European Pat. Off. . |
| 19612226A | 10/1996 | Germany . |
| 2093466 | 9/1982 | United Kingdom . |

OTHER PUBLICATIONS

English language Abstract of Japanese patent application entitled "Preparation of Ethylene–Alpha–Olefin Copolymer," dated May 14, 1990.

*Primary Examiner*—Peter D. Mulcahy
*Attorney, Agent, or Firm*—Tobor & Goldstein, L.L.P.

[57] ABSTRACT

A composition including polyalphaolefins that function as drag reducing agents and a process for the preparation of polyalphaolefins that function as drag reducing agents are disclosed. The process includes contacting alphaolefin monomers with catalyst particles in a polymerization mixture that includes a hydrocarbon solvent. The polymerization of the alphaolefin monomers produces polyalphaolefin drag reducing agents having an inherent viscosity of at least 10 dL/g. During polymerization of the polyalphaolefin monomers, localized micelles comprising high molecular weight polyalphaolefin polymer are formed in micellar zones around the catalyst particles. The polymerization is conducted in the presence of a viscosity reducing agent that includes a substantially hydrophobic dispersant. The viscosity reducing agent is present in an amount sufficient to reduce the viscosity of the reaction mixture and disperse the localized micelles. The addition of the dispersant during the polymerization process provides for high molecular weight polyalphaolefin and a more uniform molecular weight distribution of the resulting polyalphaolefin. A process of forming a polyalphaolefin drag reducing agent in one or more polymerization reactors and a process for reducing drag in a conduit are also disclosed.

14 Claims, 3 Drawing Sheets

COMPOSITION OF AND PROCESS FOR FORMING POLYALPHAOLEFIN DRAG REDUCING AGENTS

BACKGROUND OF THE INVENTION

1. Field of the Invention

This invention relates to the preparation of polyalphaolefin drag reducing agents, particularly the preparation of polymers and copolymers of alphaolefins that function as drag reducing agents.

2. Description of Related Art

The flow of liquid in a conduit, such as a pipe, results in frictional energy losses. As a result of this energy loss, the pressure of the liquid in the conduit decreases along the conduit in the direction of the flow. For a conduit of fixed diameter, the pressure drop increases with increasing flow rate. When the flow in the conduit is turbulent (Reynold's number greater than about 2100), certain high molecular weight polymers can be added to the liquid flowing in the conduit to reduce the frictional energy losses and alter the relationship between pressure drop and flow rate. These polymers, commonly referred to as drag reducing agents ("DRAs"), interact with the turbulent flow processes and reduce frictional pressure losses such that the pressure drop for a given flow rate is less, or the flow rate for a given pressure drop is greater. Because DRAs reduce frictional energy losses, increase in the flow capability of pipelines, hoses and other conduits in which liquids flow can be achieved. The use of DRAs can also decrease the cost of pumping fluids, the cost of equipment used to pump fluids, and provide for the use of a smaller pipe diameter for a given flow capacity.

Recognizing the desire to reduce frictional energy losses in the flow of liquid in pipes, a number of polymers, copolymers and methods for making polymers and copolymers have been proposed. For example, in one approach, a polymer is produced by the polymerization of an alphaolefin in a hydrocarbon solvent. The entire mixture, containing polyalphaolefin, solvent, and catalyst particles, is used without separation to make up dilute solutions of the polymer in crude oil or other hydrocarbons. In another approach, a composition of a polyacrylamide, water and a dispersing agent, which may be an anionic or nonionic surface active agent, is used. Earlier DRA polymer mixtures have certain shortcomings. For example, one of the problems associated with those DRA polymer mixtures is that the polymers, which are of high molecular weight, tend to be difficult to dissolve without degradation of the polymer and without significant reduction in molecular weight.

The present invention overcomes one or more of the shortcomings of earlier DRA polymer mixtures. In one aspect of this invention, a viscosity reducing agent that includes a substantially hydrophobic dispersant is introduced during the polymerization process. It is contemplated that the addition of the dispersant improves the bulk fluid properties and handling characteristics of the finished product and also improves the solubility of the finished product. It is further contemplated that through the process of including a dispersant during the polymerization process, a high molecular weight polyalphaolefin and a more uniform molecular weight distribution of the resulting polyalphaolefin may be achieved, thereby improving the solubility of the resulting polyalphaolefin drag reducing agent.

SUMMARY OF INVENTION

In a broad aspect, this invention relates to polyalphaolefin drag reducing agents (DRAs) useful in decreasing the frictional energy losses of materials flowing through conduits such as pipelines. As used herein, the terms "polyalphaolefin drag reducing agent" and "drag reducing agent" refers to the finished product, a composition that may include the entire polymerization mixture, which may advantageously be introduced directly in a pipeline or other conduit for reducing drag. As used herein, the term "polyalphaolefin" or "polyalphaolefins" refers to the polymer material formed by the polymerization of alphaolefin monomers. In another aspect, the polyalphaolefin drag reducing agents are formed by the polymerization of alphaolefin monomers. In another aspect, the polyalphaolefin drag reducing agents are introduced into a conduit to reduce drag. The polymerization of the alphaolefin monomers is conducted in the presence of a viscosity reducing agent. The viscosity reducing agent may be added as an initial raw ingredient or as an additive at any time during the polymerization process. Preferably, the viscosity reducing agent is added to the polymerization reaction mixture at the same time alphaolefin monomers are added. Alternatively, in a two-stage process, the viscosity reducing agent is added to the second stage while polymerization is continuing, e.g., in the absence of "catalyst killers" or any other polymerization-terminating ingredient. Preferably, the viscosity reducing agent is present in an amount sufficient to reduce the viscosity of the polymerization reaction mixture.

The viscosity reducing agent preferably includes a substantially hydrophobic dispersant such as polyacrylic acid. As used herein, the term "substantially hydrophobic" means substantially incapable of dissolving in water. Other useful dispersants include, alone or in combination, copolymers of polyacrylic acid; polymethacrylic acid; copolymers of polymethacrylic acid; polyethylene; copolymers of polyethylene; polynonylphenol and/or polybutylphenol, including copolymers of polynonylphenol and polybutylphenol, in combination with ethylene oxide and/or propylene oxide; polymers and copolymers of petroleum sulfonates; and compounds containing ethylene glycol monobutyl ether. The dispersant is preferably mixed with an aromatic based solvent such as heavy aromatic naphtha, xylene, toluene, benzene and derivatives of heavy aromatic naphtha, xylene, toluene and benzene. The process may be a batch process, although it is contemplated that the process may also be continuous. The process may be performed in a single stage or multiple stages.

In another aspect of the invention, the alphaolefin monomers that are to be polymerized in the presence of the viscosity reducing agent are polymerized in the presence of a metallocene catalyst and a cocatalyst and in the presence of a hydrocarbon solvent. However, it is contemplated that other catalysts may be used, such as conventional Ziegler-Natta catalysts. The polymerization is conducted under conditions such that the polyalphaolefin has an inherent viscosity of at least 10 deciliters per gram (dL/g). In a specific embodiment, the polyalphaolefin has an inherent viscosity of at least from about 10–15 dL/g.

In still another aspect of the invention, localized "micelles" or droplets comprising high molecular weight polyalphaolefin polymer are formed in micellar or droplet zones around the catalyst particles during the polymerization of alphaolefin monomers. Advantageously, the viscosity reducing agent that is present during polymerization reduces the viscosity of the reaction mixture and disperses the localized micelles or droplets.

In yet another aspect of this invention, a metallocene catalyst slurry is prepared by mixing the solid metallocene catalyst with a small amount of hydrocarbon solvent, such as olefin, and is directed to a storage vessel. The catalyst slurry is then metered from the storage vessel into a first reactor where it is mixed in desired proportions with the cocatalyst, the viscosity reducing agent and the alphaolefins which are metered from a separate vessel or vessels. The polymerization is initiated in the first reactor at an appropriate temperature and pressure. A second reactor may be provided in which the polymerization is continued and from which the polyalphaolefin drag reducing agent may be recovered. In one aspect, materials, including the catalyst slurry, the viscosity reducing agent, hydrocarbon solvent, unreacted alphaolefins, oligomers and formed polymer may be continuously pumped from the first reactor into the second reactor where the molecular weight of the formed polymer product may be increased while fresh reactants may be added to the first reactor as the material is pumped into the second reactor.

DETAILED DESCRIPTION OF THE INVENTION

Figure 1:
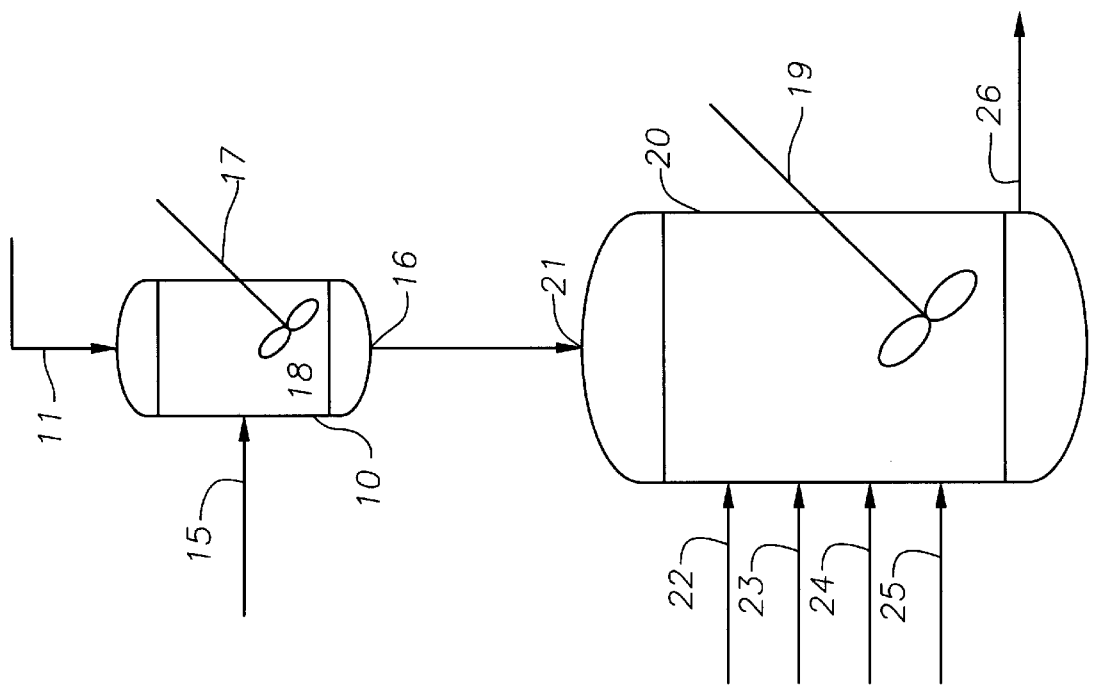
FIG. 1 is a flow diagram of a single-stage batch process of the invention.

As discussed above, this invention relates to polyalphaolefin drag reducing agents and a process of forming polyalphaolefins that form part of the DRAs. In one broad aspect, this invention is directed to a process for forming a polyalphaolefin drag reducing agent by the polymerization of alphaolefin monomers in the presence of a hydrocarbon solvent and catalyst. The polyalphaolefin produced through the polymerization of the alphaolefin monomers are of high molecular weight, preferably having an inherent viscosity of at least 10 deciliters per gram (dL/g). In a specific embodiment, the polyalphaolefin has an inherent viscosity of at least 10 dL/g.

At a selected point during the polymerization reaction, a viscosity reducing agent is introduced. The viscosity reducing agent may be added with reactants prior to the polymerization or at any point during the polymerization reaction. The viscosity reducing agent includes a substantially hydrophobic dispersant. If an aromatic solvent is not initially included as a portion of the hydrocarbon solvent, the viscosity reducing agent preferably includes an aromatic solvent.

In another aspect of the invention, during the process of polymerization, a portion of the alphaolefin monomers polymerize to form localized micelles of high molecular weight polyalphaolefin polymer in micellar zones around the catalyst particles. The "micelles" as referred to herein are droplets of high molecular weight polymer. The viscosity reducing agent, preferably present in an amount sufficient to reduce the viscosity of the reaction mixture, disperses the localized micelles of high molecular weight polyalphaolefin polymer. It is contemplated that this dispersion provides for improved contact between unreacted monomer and/or low molecular weight polymer material (i.e., oligomers) and the catalyst polymerizing the unreacted monomer and low molecular weight polymer to form high molecular weight polyalphaolefin polymer. In a preferred aspect, it is contemplated that such improved contact results in a polymer having higher molecular weight and/or a more uniform molecular weight distribution. Additionally, it is contemplated that such improved contact results in a finished product having a higher weight percent of completed polymer.

In another aspect, this invention is directed to a high molecular weight polyalphaolefin drag reducing agent formed by a process wherein a substantially hydrophobic dispersant is added during the polymerization reaction. The polyalphaolefin drag reducing agent includes a high molecular weight polyalphaolefin that preferably has an inherent viscosity of at least 10 deciliters per gram and a more uniform molecular weight distribution and increased solubility.

The alphaolefin monomers which can be polymerized in this invention include any alphaolefins that are capable, upon polymerization, of accomplishing a desired drag reducing effect. However, generally, the alphaolefins are those having 2 to 20 carbon atoms. Preferred alphaolefins that can be polymerized by the process of the present invention include ethylene, propylene, 1-butene, 4-methyl-1-pentene, 1-hexene, 1-octene, 1-decene, 1-dodecene and 1-tetradodecene; conjugated or unconjugated dienes such as butadiene and 1,4-hexadiene; aromatic vinyls such as styrene; and cyclic olefins such as cyclobutene. A mixture of two or more of these olefins may be polymerized. The preferred alphaolefin monomers of this invention are 1-hexene through 1-tetradecene.

The polymerization may be conducted through any of the processes of liquid phase polymerization, gas phase polymerization, bulk polymerization, suspension polymerization and emulsion polymerization. The polymerization process can be employed practicing batch or continuous techniques and may be in one or more stages.

Liquid phase polymerization is preferred. The hydrocarbon solvent for the liquid phase polymerization includes aliphatic hydrocarbons such as pentane, hexane, heptane, octane, nonane and decane; alicyclic hydrocarbons such as cyclohexane; and aromatic hydrocarbons such as benzene, toluene, xylene and heavy aromatic naphtha.

The catalysts of the present invention include any catalysts that are capable of polymerization, including liquid catalyst such as titanium tetrachloride. Preferably, Ziegler-Natta and metallocene catalysts are employed in the invention. For more details on traditional Ziegler-Natta catalysts, see for example, U.S. Pat. No. 5,442,019, the disclosure of which is incorporated by reference to the extent not inconsistent with the practicing of the present invention. A more preferred catalyst is a metallocene catalyst. Suitable metallocene catalysts that may be employed include any metallocene compounds known in the art. One advantage of metallocene catalyst is that, unlike Ziegler-Natta catalysts, its activity is not inhibited if a dispersant (further described below) containing oxygen is used. Examples of suitable metallocene compounds, their preparation, suitable cocatalysts, and their use in polymerization processes are described in U.S. Pat. Nos. 5,442,019 and 5,416,179, the disclosures of which arc herein incorporated by reference, to the extent not inconsistent with the practicing of the present invention. It is further contemplated that the metallocene catalyst may be supported on support materials known in the art, for example, inorganic oxides, such as silica, alumina or magnesia, or polymeric materials, such as polyethylene. The concentration of the metallocene catalyst of the present invention is preferably in the range of at least about 1 to 2000 moles olefin per mole of catalyst and higher, more preferably from about 10 to 1000 moles olefin per mole of catalyst.

The polymerization temperature is not critical and is normally in the range of from about −70° C. to about 230° C. The pressure of the reaction mixture is also not critical, and usually is in the range of from about atmospheric pressure to about 1500 psig.

The viscosity reducing agent includes a hydrophobic dispersant. During polymerization, alphaolefin monomers polymerize to form localized micelles of high molecular weight polyalphaolefin in micellar zones around the catalyst particles. It is contemplated that the monomer material in contact with the catalyst polymerizes to form polymer of higher molecular weight more rapidly than the monomer material that is not in contact with the catalyst. The higher molecular weight polymer is of higher viscosity than the surrounding monomer and polymer material, further limiting the polymerization of the surrounding material. Consequently, there can be a large variation in the molecular weight distribution of the finished polyalphaolefin material. Accordingly, it is contemplated that the viscosity reducing agent of the present invention, which includes a substantially hydrophobic dispersant and is added prior to and/or during polymerization, reduces the viscosity of the reaction mixture and disperses the localized micelles of high molecular weight polymer, thus improving the tendency for the catalyst to contact unreacted monomer and low molecular weight polymer material. Preferably, the dispersants of this invention do not substantially impair the polymerization process. The viscosity reducing agent may be introduced prior to and/or during polymerization in any manner that provides reduction in the viscosity of the reaction mixture and disperses the localized micelles of high molecular weight polymer. Consequently, as another important feature of this invention, through the addition of the viscosity reducing agent prior to and/or during the process of polymerization, the molecular weight distribution of the polyalphaolefin may be controlled to achieve a more uniform molecular weight distribution. Advantageously, by controlling the molecular weight distribution, solubility of the resulting polyalphaolefin drag reducing agent may be improved. It is contemplated that by varying the concentration of the dispersant, the molecular weight of the polyalphaolefin may be controlled. It is further contemplated that a preferred concentration of the dispersant is from about 0.5 ppm to about 50,000 ppm of the polymerization mixture.

Preferred dispersants are polymers and copolymers of acrylates and methacrylates; polymers and copolymers of ethylene; polymers and copolymers produced from the polymerization of nonylphenol and butylphenol in combination with ethylene oxide and/or propylene oxide; compounds or blends of compounds containing petroleum sulfanates; and compounds containing ethylene glycol monobutyl ether (butyl "Cellosolve"). Most preferably, the polymers and copolymers of the acrylates and methacrylates are utilized as the dispersant.

As another feature of this invention, the viscosity reducing agent may also include an aromatic solvent. Preferred aromatic solvents are xylene, toluene, benzene and heavy aromatic naphtha. In a preferred embodiment, the aromatic solvent is from about 85 to 95 weight percent of the viscosity reducing agent and the dispersant is from about 5 to 15 weight percent. More preferably, the aromatic solvent is from about 88 to 93 weight percent of the viscosity reducing agent and the dispersant is from about 7 to 12 weight percent, and most preferably the aromatic solvent is about 90 weight percent of the viscosity reducing agent and the dispersant is about 10 weight percent.

The polyalphaolefins of this invention are of high molecular weight. In general, these polyalphaolefins will have an inherent viscosity of at least 10 deciliters per gram (dL/g). The inherent viscosity of the polyalphaolefins is determined by a Cannon-Ubbelohde four bulb sheir dilution viscometer (0.1 g polymer/100 ml toluene at 25° C.). Inherent viscosities are calculated for each of the four bulbs. The viscosities are then plotted as a function of shear rate. The plot is then used to determine the inherent viscosity at a shear rate of 300 sec−1.

Referring now to FIG. 1, in a specific embodiment, polyalphaolefin drag reducing agents are prepared in a batch polymerization system. The apparatus includes a catalyst preparation tank 10 and a batch reaction vessel 20. The catalyst preparation tank 10 includes a first inlet 11 for receiving catalyst and a second inlet 15 for receiving hydrocarbon solvent or alphaolefin, or a combination thereof. An appropriate mixing or agitation device 17 mixes the catalyst material with the hydrocarbon solvent, alphaolefin, or combination thereof to form a catalyst slurry 18. The catalyst preparation tank 10 has an outlet 16 in communication with a first inlet 21 of the batch reaction vessel 20. Valves, pumps and other devices (not shown) may be interposed before the catalyst preparation tank and between the catalyst preparation tank 10 and batch reaction vessel 20 as necessary. The batch reaction vessel 20 has a second inlet 22 for introduction of alphaolefin material to be polymerized. The batch reaction vessel 20 also has a third inlet 23 for the introduction of co-catalyst, a fourth inlet 24 for the introduction of the viscosity reducing agent that includes the substantially hydrophobic dispersant, and a fifth inlet 25 for the introduction of hydrocarbon solvent. Aromatic solvent may also be introduced through inlet 24 or, alternatively, may be introduced separately through inlet 25. The batch reaction vessel 20 also includes an appropriate mixing or agitation device 19. In one embodiment the catalyst slurry 18, prepared in the catalyst preparation tank 10, is introduced to the batch reaction vessel 20 through inlet 21 of the batch reaction vessel 20 and is mixed in desired proportions with co-catalyst, the viscosity reducing agent and alphaolefin material which are metered into the batch reaction vessel 20 through inlets 23, 24 and 22 respectively. Polymerization is initiated at appropriate temperatures and pressures. Alternatively, polymerization may be initiated at appropriate temperatures and pressures prior to the introduction of the viscosity reducing agent, the viscosity reducing agent thereafter being introduced during polymerization. Polymerization may be terminated naturally when all the monomer in the reactor is consumed or alternatively, by introducing a deactivator. The polyalphaolefin drag reducing agent material formed by the process of polymerization may be withdrawn from the batch reaction tank 20 through inlet 26. Valves, pumps and other devices (not shown) may be interposed as necessary to remove the entire mixture, including formed polyalphaolefin, from the batch reaction polymerization vessel.

Figure 2:
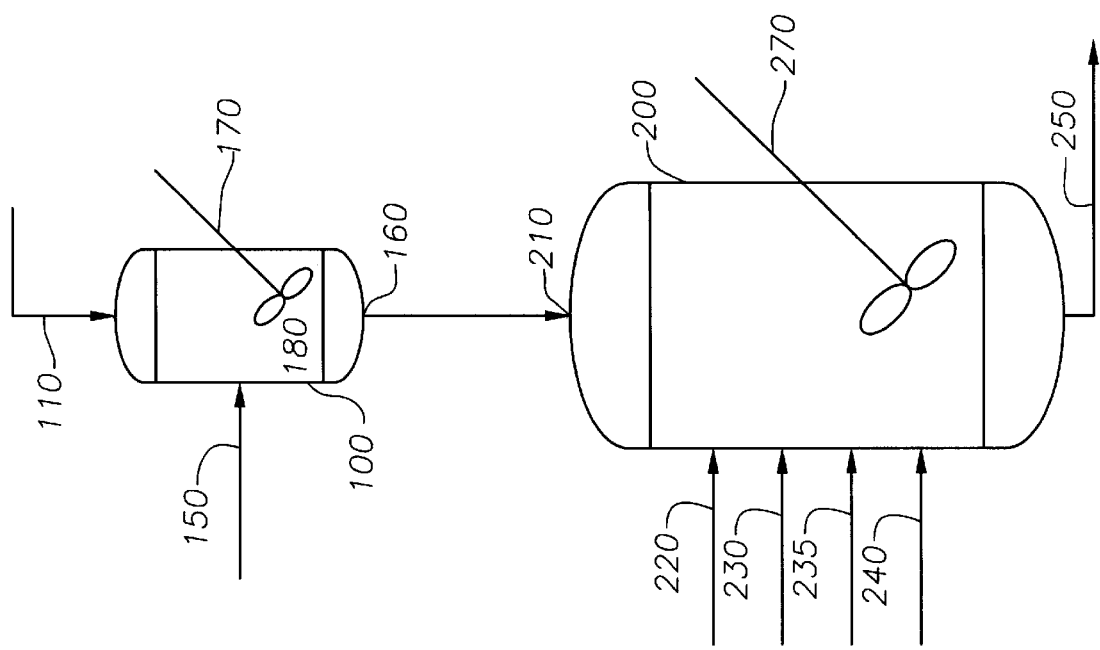
FIG. 2 is a flow diagram of a single-stage continuous process of the invention.

In accordance with another embodiment of this invention, shown in FIG. 2, a catalyst slurry 180 that includes metallocene catalyst may be prepared in a catalyst preparation and storage vessel 100 by mixing the metallocene catalyst introduced through inlet 110 with an alphaolefin or hydrocarbon solvent or combination thereof introduced through inlet 150 to form a catalyst slurry. The catalyst preparation and storage vessel may include a mixing or agitation device 170 as necessary. The catalyst preparation and storage vessel has outlet 160 in communication with a first inlet 210 of a first reactor 200. The catalyst slurry 180 may be continuously metered from the catalyst preparation and storage vessel 100 through outlet 160 in communication with first inlet 210 of a first reactor 200 into the first reactor 200 whereby the catalyst slurry 180 is mixed in desired proportions with a cocatalyst introduced through second inlet 230 alphaolefin monomers introduced through third inlet 220 and hydrocarbon solvent introduced through fourth inlet 235, which are continuously metered from other sources not shown. Polymerization is initiated in the first reactor 200 at appropriate temperatures and pressures. First reactor 200 includes an appropriate mixing or agitation device 270 and an outlet 250 for removal of polyalphaolefin and the other materials in the reactor 200. The viscosity reducing agent, which includes a substantially hydrophobic dispersant, may also be metered from a separate source into the first reactor 200 through a fifth inlet 240 prior to commencing the polymerization reaction. Additionally, or alternatively, the viscosity reducing agent may be metered into the first reactor 200 through fifth inlet 240 during polymerization. Additional reactors may also be provided in which polymerization continues and from which high molecular weight polyalphaolefin drag reducing agent product may be recovered.

Figure 3:
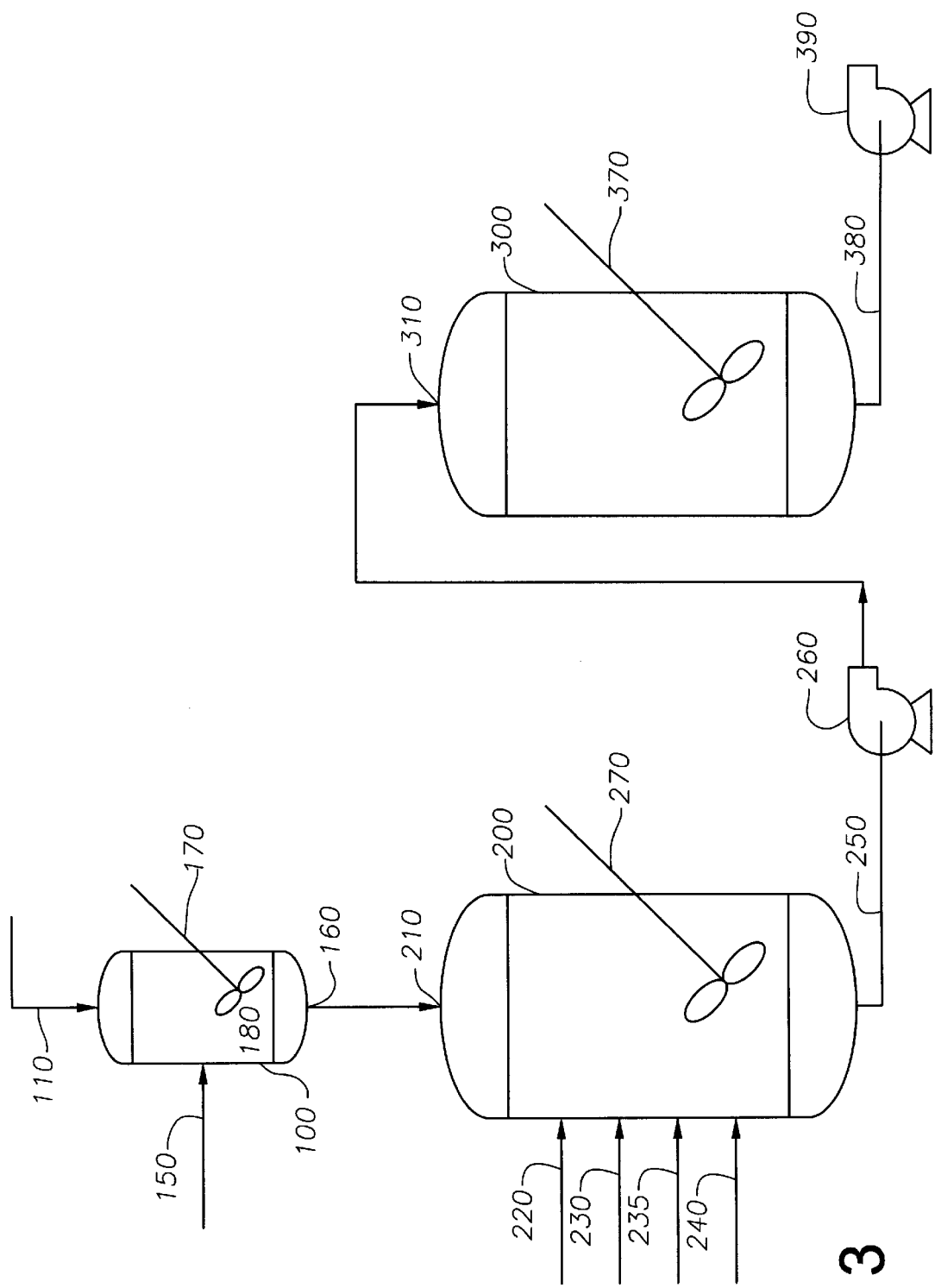
FIG. 3 is a flow diagram of a two-stage continuous process of the invention.

In another embodiment, referring to FIG. 3, a second reactor 300 is provided in which the materials of the first reactor 200 (also shown in FIG. 2), including catalyst slurry, hydrocarbon solvent, unreacted alphaolefin, oligomers and polyalphaolefin may be pumped continuously from outlet 250 of the first reactor by pump 260 into the second reactor 300 through inlet 310, where the molecular weight of the polyalphaolefin drag reducing agent polymer is further increased. Additionally, viscosity reducing agent may also be metered into the second reactor (not shown). Second reactor 300 includes an appropriate mixing or agitation device 370 and outlet 380 for removal of the DRA product which includes polyalphaolefin and the other remaining materials in second reactor 300. Removal of the polyalphaolefin and other remaining materials in reactor 300 may be accomplished by pump 390. Valves, pumps and other devices (not shown) may be interposed as necessary. As another feature of this invention, fresh reactant may be added to the first reactor 200 as material is being pumped from the first reactor 200 to the second reactor 300. The reaction may be terminated by introducing a deactivator (not shown) or, alternatively, the reaction may terminate naturally when all the monomer in the reactors are consumed. As an additional option and additional feature of the invention, the reaction may be continued by forwarding the formed polyalphaolefin and other remaining materials to a pressurized storage vessel (not shown) where the molecular weight of the formed polyalphaolefin may yet be further increased. The polyalphaolefin drag reducing agent may be introduced into a conduit to reduce frictional energy losses of the material flowing through the conduit.

It is to be understood that the invention is not limited or restricted to the specific embodiments described herein, which are intended to assist a person skilled in the art in practicing the invention. Although the invention is preferably directed to the formation or recovery of polyalphaolefin drag reducing agents, it is not necessarily limited to such applications. The invention may also be used to control the molecular weight distribution of the high molecular weight polyalphaolefins, allowing more durable or more potent molecules to be produced as desired. Additionally, various components may be configured or connected in a variety of ways to carry out the process of the invention. Accordingly, the scope of the invention should be determined based on the claims below, including any equivalents thereof.

What is claimed:

1. A liquid phase polymerization process for forming a liquid polyalphaolefin drag reducing agent, comprising:

contacting alpha olefin monomers with catalyst particles in a liquid phase polymerization mixture comprising a hydrocarbon solvent, wherein said hydrocarbon solvent is selected from the group consisting of aromatic, alicyclic and aliphatic hydrocarbons; and polymerizing said alpha olefin monomers to provide a liquid polyalphaolefin having an inherent viscosity of at least 10 deciliters per gram;

wherein during said liquid phase polymerization at least a portion of said alpha olefin monomers polymerize in said liquid phase polymerization mixture to form localized micelles comprising high molecular weight liquid polyalphaolefin polymer in micellar zones around said catalyst particles; and said liquid phase polymerization is conducted in the presence of a viscosity reducing agent comprising a substantially hydrophobic dispersant, said viscosity reducing agent being present in an amount sufficient to reduce the viscosity of the liquid phase polymerization mixture and disperse said localized micelles.

2. The process of claim 1 in which the catalyst particles comprise metallocene.

3. The process of claim 1 in which the viscosity reducing agent additionally comprises all aromatic solvent.

4. The process of claim 3 in which the aromatic solvent comprises a substance selected from the group consisting of xylene, toluene, benzene, a heavy aromatic naphtha, and derivatives of xylene, toluene, benzene, and heavy aromatic naphtha.

5. The process of claim 1 in which the hydrocarbon solvent comprises an aromatic solvent.

6. The process of claim 1 in which the dispersant occupies from about 0.5 ppm to about 50,000 ppm of the polymerization mixture.

7. The process of claim 3 in which the viscosity reducing agent comprises from about 5 to 15 weight percent dispersant and from about 85 to 95 weight percent aromatic solvent.

8. The process of claim 3 in which the viscosity reducing agent comprises from about 7 to 12 weight percent dispersant and from about 88 to 93 weight percent aromatic solvent.

9. The process of claim 3 in which the viscosity reducing agent comprises more than about 10 weight percent dispersant and less than about 90 weight percent aromatic solvent.

10. The process of claim 1 in which the substantially hydrophobic dispersant comprises polyacrylic acid or polymethacrylic acid.

11. The process of claim 1 in which the substantially hydrophobic dispersant comprises, alone or in combination, ethylene glycol monobutyl ether; a copolymer formed by the copolymerization of a first comonomer and a second comonomer, the first comonomer comprising acrylic acid; a copolymer formed by the copolymerization of a first comonomer and a second comonomer, the first comonomer comprising methacrylic acid; polyethylene; a copolymer formed by the copolymerization of a first comonomer and a second comonomer, the first comonomer comprising ethylene; a polymer produced from the polymerization of petroleum sulfonate; a copolymer formed by the copolymerization of a first comonomer and a second comonomer, the first comonomer comprising petroleum sulfonate; a first substance, comprising a polymer selected from the group consisting of polynonylphenol and polybutylphenol, and a second substance selected from the group of ethylene oxide and propylene oxide; a first substance comprising a copolymer formed by the copolymerization of a first comonomer and a second comonomer, the first comonomer comprising nonylphenol and the second comonomer comprising butyphenol, and a second substance selected from the group of ethylene oxide and propylene oxide.

12. The process of claim 1 in which the hydrocarbon solvent comprises xylene, toluene, benzene or naphtha.

13. The process of claim 1 in which the hydrocarbon solvent comprises a heavy aromatic naphtha.

14. A liquid phase polymerization process for forming a liquid polyalphaolefin drag reducing agent, comprising:

contacting alpha olefin monomers with catalyst particles in a liquid phase polymerization mixture comprising a hydrocarbon solvent, wherein said hydrocarbon solvent is selected from the group consisting of aromatic, alicyclic and aliphatic hydrocarbons; and polymerizing said alpha olefin monomers to provide a liquid polyalphaolefin having an inherent viscosity of at least 10 deciliters per gram; wherein said liquid phase polymerization is conducted in the presence of a viscosity reducing agent comprising a substantially hydrophobic dispersant.

\* \* \* \* \*